(12) United States Patent
Plant

(10) Patent No.: US 8,616,244 B2
(45) Date of Patent: Dec. 31, 2013

(54) TUBING AND METHOD FOR MANUFACTURE

(75) Inventor: Kenneth R. Plant, Leominster, MA (US)

(73) Assignee: Waters Technologies Corporation, Milford, CT (US)

(*) Notice: Subject to any disclaimer, the term of this patent is extended or adjusted under 35 U.S.C. 154(b) by 904 days.

(21) Appl. No.: 12/441,401

(22) PCT Filed: Sep. 17, 2007

(86) PCT No.: PCT/US2007/078613
§ 371 (c)(1),
(2), (4) Date: Jul. 9, 2009

(87) PCT Pub. No.: WO2008/036583
PCT Pub. Date: Mar. 27, 2008

(65) Prior Publication Data
US 2010/0065141 A1    Mar. 18, 2010

Related U.S. Application Data

(60) Provisional application No. 60/826,121, filed on Sep. 19, 2006.

(51) Int. Cl.
*F16L 9/18* (2006.01)
(52) U.S. Cl.
USPC ............................. 138/114; 138/142; 138/143
(58) Field of Classification Search
USPC .......................... 138/109, 110, 114, 142, 143
See application file for complete search history.

(56) References Cited

U.S. PATENT DOCUMENTS

| 2,311,138 | A | * | 2/1943 | Swartz | 138/151 |
| 2,516,689 | A | * | 7/1950 | France et al. | 138/143 |
| 3,120,247 | A | * | 2/1964 | Vogler | 138/148 |
| 3,209,856 | A | * | 10/1965 | Saunders | 181/228 |
| 4,538,337 | A | * | 9/1985 | Holbrook et al. | 29/445 |
| 4,556,240 | A | * | 12/1985 | Yoshida | 285/55 |

(Continued)

FOREIGN PATENT DOCUMENTS

JP    2001353519 A    12/2001

OTHER PUBLICATIONS

International Application No. PCT/US07/78613, International Search Report, Jun. 26, 2008.

(Continued)

*Primary Examiner* — James Hook
(74) *Attorney, Agent, or Firm* — Nielsen IP Law LLC

(57) ABSTRACT

An apparatus for conveying fluid comprising a first tube and a second tube. The first tube has a first end and a second end, an inner wall and an outer wall. The inner wall defines a passage for fluid and an outer wall has at least one first receiving section for receiving an inner wall from the second tube. The second tube has a first end and a second end, an inner wall and an outer wall. The inner wall defines a chamber for receiving the first tube and has at least one second receiving section for receiving the outer wall of the first tube wherein at least one of the first tube and the second tube are drawn down such that the first receiving section and the second receiving section of the first tube and the second tube are in close proximity to each other and sealed.

13 Claims, 4 Drawing Sheets

(56) References Cited

U.S. PATENT DOCUMENTS

| | | | |
|---|---|---|---|
| 4,784,311 A * | 11/1988 | Sugao | 228/131 |
| 5,253,680 A * | 10/1993 | Matsumoto | 138/148 |
| 5,520,223 A | 5/1996 | Iorio et al. | |
| 6,293,311 B1 * | 9/2001 | Bushi et al. | 138/138 |
| 6,659,137 B2 | 12/2003 | Imasaki et al. | |
| 2003/0094209 A1 * | 5/2003 | Imasaki et al. | 138/142 |
| 2005/0005983 A1 | 1/2005 | Lewis | |
| 2005/0082092 A1 * | 4/2005 | Hall et al. | 175/325.1 |
| 2010/0012217 A1 * | 1/2010 | Herbst | 138/143 |
| 2011/0306930 A1 * | 12/2011 | Moersch et al. | 604/151 |

OTHER PUBLICATIONS

International Application No. PCT/US07/78613, Written Opinion of the International Search Authority, Mar. 19, 2009.

International Application No. PCT/US07/78613, International Preliminary Report on Patentability Chapter I, Mar. 24, 2009.

European Application No. EP20070853538, Amendments Received Before Examination, May 28, 2009.

European Application No. EP20070853538, Amended Claims Filed After Receipt of European Search Report, May 28, 2009.

Japanese Application No. 2009-529318, Translation of Notice of Rejection, Aug. 13, 2012.

* cited by examiner

TUBING AND METHOD FOR MANUFACTURE

CROSS REFERENCE TO RELATED APPLICATIONS

This application is the National Stage of International Application No. PCT/US2007/078613, filed Sep. 17, 2007 and designating the United States, which claims benefit of a priority from U.S. Provisional Patent Application No. 60/826,121 filed 19 Sep. 2006.

BACKGROUND OF THE INVENTION

This invention relates to tubing and methods of making tubing for conveying liquids. More specifically, embodiments of the present invention are directed to narrow internal diameter tubing. Embodiments of the present invention have particular utility for use in chromatographic equipment which use tubing to convey fluids under precise flow regimes.

It is difficult to make very small narrow internal diameter tubing, with an internal diameter in the region of about 0.002-0.005 inches (0.0508-0.127 mm).

Many known types of narrow tubing exhibit a poor internal finish, which can lead to wide internal diameter fluctuations, a lack of internal diameter/external diameter concentricity and possibly flow obstructions. These problems are due to the rigours of the manufacturing process using multiple drawings. Multiple drawings are required to make tubes of such small internal diameter. The resulting tubing is undesirable to use because it results in a reduced efficiency of the chromatographic equipment.

It is preferable that the tubing is robust in use. It is preferable that the tubing can bend without becoming kinked.

It is preferable to have tubing with a better internal finish, that is sufficiently robust.

SUMMARY OF THE INVENTION

Embodiments of the present invention are directed to an apparatus having precision control of internal diameter and internal finish and methods of making and using such apparatus.

One embodiment of the present invention directed to the apparatus for conveying fluid. The apparatus comprises a first tube and a second tube. The first tube has a first end and a second end, an inner wall and an outer wall. The inner wall defines a passage for fluid and an outer wall has at least one first receiving section for receiving an inner wall from the second tube. The second tube has a first end and a second end, an inner wall and an outer wall. The inner wall defines a chamber for receiving the first tube and has at least one second receiving section for receiving the outer wall of the first tube wherein at least one of the first tube and the second tube are drawn down such that the first receiving section and the second receiving section of the first tube and the second tube are in close proximity to each other and sealed.

As used herein the term "tube" is used to denote, a conduit, pipe, capillary, or open ended substantially cylindrical structure.

As used herein the term "drawn down" is used to denote pulled or pressed into a deformed and compressed state.

As used herein the term "sealed" is used to denote being drawn down and compressed to be substantially fluid tight, or closed by laser welding, electron beam welding, brazing or soldering.

Embodiments of the present apparatus are well suited for applications which require a small internal passage. Embodiments of the present invention can receive standard fittings. Embodiments of the present invention have particular utility at the pressures within chromatography instruments.

Preferably, the first tube and the second tube are sealed at least one of the ends, even more preferably at both ends.

Preferably, at least one of the first tube and the second tube is made of metal. Even more preferably the metal is selected from the group consisting of: —copper, stainless steel, stainless steel alloys, steel, iron, nickel, nickel alloys, cobalt alloys, nickel/cobalt alloys, brass, copper alloys, aluminium or aluminium alloys.

Preferably, the inner wall of the first tube has a diameter in the range of 0.002-0.005 inch (0.0508-0.127 mm). Preferably, the inner wall of the first tube has a diameter below 0.125 inch (3.175 mm).

Preferably the first tube is a thin walled tube made of 304 or 316 grade stainless steel. This grade of stainless steel is commonly used for hypodermic needles.

Preferably the first tube and the second tube are sealed by laser welding, electron beam welding, or brazing.

A further embodiment of the present invention directed to a method of manufacture of an apparatus for conveying fluid. The method comprises the steps of providing a first tube and a second tube. The first tube has a first end and a second end, an inner wall and an outer wall. The inner wall defines a passage for fluid and an outer wall has at least one first receiving section for receiving an inner wall from the second tube. The second tube has a first end and a second end, an inner wall and an outer wall. The inner wall defines a chamber for receiving the first tube and has at least one second receiving section for receiving the outer wall of the first tube. The method further comprises the step of drawing down the second tube so that the first receiving section and the second receiving section are in close proximity to each other. Next the method comprises the step of sealing the receiving sections of the tubes to form an apparatus for conveying fluid.

Preferably, the first tube and the second tube are sealed at both ends.

Preferably, at least one of the first tube and the second tube is made of metal. Even more preferably the metal is selected from the group consisting of: —copper, stainless steel, stainless steel alloys, steel, iron, nickel, nickel alloys, cobalt alloys, nickel/cobalt alloys, brass, copper alloys, aluminium or aluminium alloys.

Preferably, the first tube is made of stainless steel and the second tube is made of copper.

Preferably, the inner wall of said first tube has a diameter in the range of 0.002-0.005 inch (0.0508-0.127 mm). Preferably, the inner wall of said first tube has a diameter below 0.125 inch (3.175 mm).

Preferably the first tube is a thin walled tube made of 304 or 316 grade stainless steel.

Preferably, the first tube and said second tube are sealed by laser welding, electron beam welding, brazing or soldering One embodiment features at least two second tubes. More preferably the at least two second tubes are positioned at the first end and the second end of the first tube.

Preferably the first tube and the second tube are co-drawn.

A further embodiment of the present invention directed to a method of fluid conveyance comprising providing an apparatus with a first tube and a second tube.

The first tube has a first end and a second end, an inner wall and an outer wall, the inner wall defines a passage for fluid and the outer wall has at least one first receiving section for receiving an inner wall from the second tube. The second tube has a first end and a second end, an inner wall and an outer wall, the inner wall defines a chamber for receiving said first tube and has at least one second receiving section for receiving the outer wall of the first tube where the receiving sections of the first tube and the second tube are drawn down in close proximity to each other and sealed. A fluid is directed into the passage at the first end and removed at the second end of the passage.

Thus, embodiments of the present invention are directed to apparatus, and methods providing fluid conveying conduits with internal finishes with greater uniformity. These and other benefits will be apparent to those individuals skilled in the arts upon viewing the drawings and reading the detailed description

DETAILED DESCRIPTION OF THE DRAWINGS

Embodiments of the present invention will be described with respect to chromatography instruments with the understanding that the invention has broad application in other fields and apparatus as well.

Figure 1:
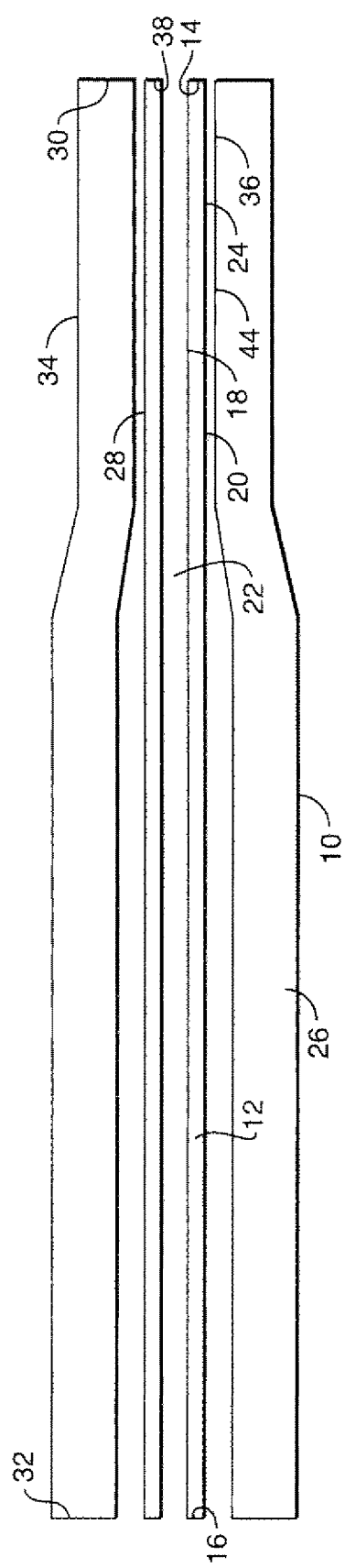
FIG. 1 depicts an apparatus in accordance with the invention.

Turning now to FIG. 1, such figure depicts an apparatus designated by the numeral (10) embodying features of the present invention. The apparatus comprises a first tube (12) and a second tube (26). The first, inner tube (12) has a first end (14) and a second end (16), an inner wall (18) and an outer wall (20). The inner wall defines a passage (22) for fluid. The outer wall (20) has a receiving section (24) for receiving an inner wall (28) from a second tube (26).

The second tube (26) has a first end (30) and a second end (32), an inner wall (28) and an outer wall (34). The inner wall (28) defines a chamber (44) for receiving said first tube (10). The second tube (26) has at least one second receiving section (36) for receiving the outer wall (20) of the first tube (12).

The second tube (26) is drawn down so that the receiving section of the first tube (24) and the receiving section of the second tube (36) are in close proximity to each other and sealed (38) by welding.

Preferably the second tube (26) is drawn down along the whole length of the apparatus. In the case where the second tube (26) is drawn down along the whole length of the apparatus, the receiving section of the first tube (24) and the receiving section of the second tube (36) may be the whole length of the first tube (12) and the second tubes (26).

The first tube (12) and the second tube (26) may be in contact with each other, or just in close proximity to each other. Preferably, the first tube (12) and the second tube (26) are in the range 1/100 to 1/2000 inch (0.254-0.0508 mm) apart, Most preferably, the tubes should be approximately 1/1000 inch apart (0.0254 mm).

The first, inner tube (12) can be made from one of many different materials, typically the tubes will be made of metal. There are a large variety of different metals that can be used. These include: copper, stainless steel, stainless steel alloys, steel, iron, nickel, nickel alloys, cobalt alloys, nickel/cobalt alloys, brass, copper alloys, aluminium or aluminium alloys. Most preferably, the metal is 304 grade stainless steel or 316 grade stainless steel.

The second, outer tube (26) can be made from one of many different materials, typically the tubes will be made of metal. There are a large variety of different metals that can be used. These include: copper, stainless steel, stainless steel alloys, steel, iron, nickel, nickel alloys, cobalt alloys, nickel/cobalt alloys, brass, copper alloys, aluminium or aluminium alloys. Most preferably, the metal is stainless steel or copper.

Copper is malleable and capable of being drawn down. Copper also would have particular application in thermally sensitive systems, where the temperature of the liquid inside the tubing needs to be regulated by that of the external environment.

Stainless steel is unreactive and durable. Stainless steel would be the preferred metal in most standard chromatography equipment The first tube (12) and the second tube (26) can be sealed in a variety of ways. It would be apparent to a person skilled in the art that the method of sealing the receiving sections of the pipes may be by laser welding, electron beam welding, brazing, soldering, or one of many other suitable methods. Methods of laser welding, electron beam welding, brazing or soldering are well known to a person skilled in the art.

Once the apparatus (10) is formed, the apparatus is used by connecting to a fluid source (not shown). The methods of attachment are well known to a person skilled in the art. The apparatus (10) is attached to a port using standard fittings within a liquid chromatography device. One type of standard fitting is a steel compression screw with a metal feral attachment to attach the tubing to the port. A second standard fitting may include a steel compression screw, a collett and a PEEK feral to attach the tubing to the input port.

Figure 2:
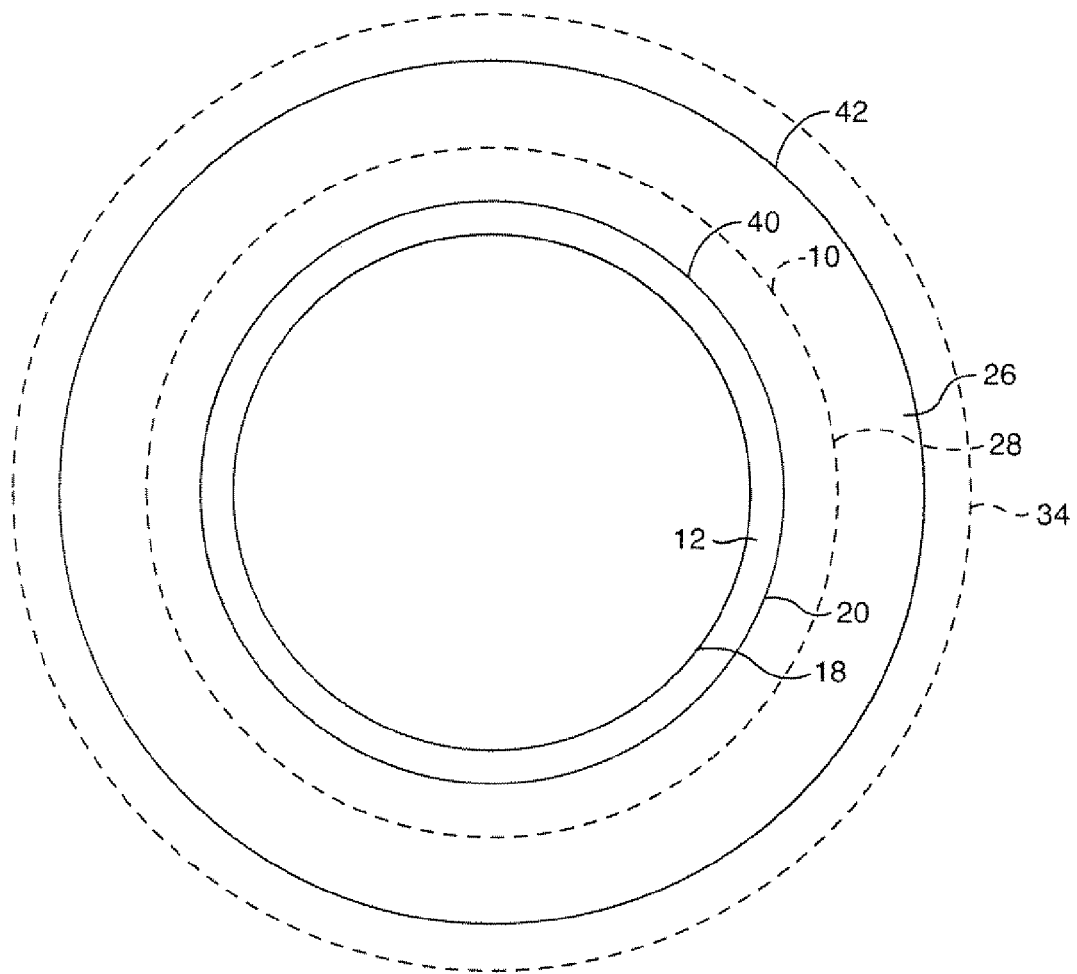
FIG. 2 depicts a cross section view of an apparatus in accordance with the invention

Turning now to FIG. 2, which depicts an end view of an apparatus (10) the first, inner tube (12) has an inner wall (18) and an outer wall (20). The original shape of the second outer tube (26) before sealing is shown by dotted lines. The outer tube (26) had an inner wall (28) and an outer wall (34). Once sealed the inner wall of the outer tube (40) is now attached to the outer wall of the inner tube (20). The outer wall of the outer tube after sealing also has a reduced diameter (42). The first tube (12) and the second tube (26) can be sealed in a variety of ways. The method of sealing the pipes may be by laser welding, electron beam welding, brazing, soldering, or one of many other suitable methods. Methods of laser welding, electron beam welding, brazing or soldering are well known to a person skilled in the art.

Figure 3:
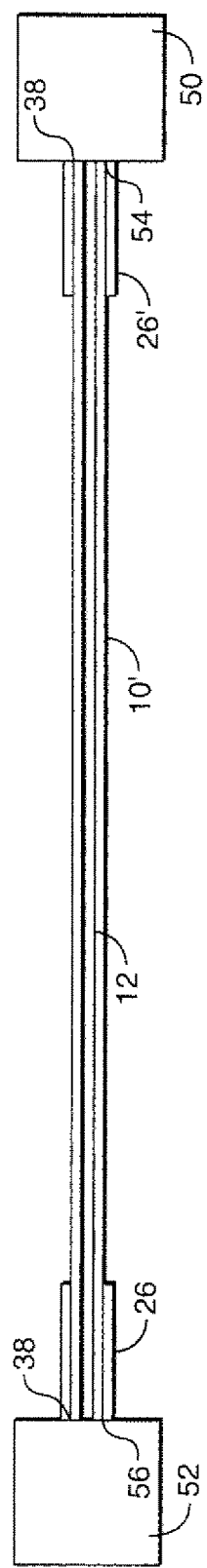
FIG. 3 depicts an apparatus embodying of the invention attached.

FIG. 3 shows an apparatus (10') in accordance with an alternative aspect of the invention. In this aspect of the invention, the inner tube (12) extends between a liquid production means (50) and a liquid analysis means (52). In this embodiment two outer tubes (26 and 26') are provided. One outer tube (26) is positioned next to the liquids production means (52). The inner tube (12) and the first outer tube (26) are sealed (38). The first end of the first tube (14) and the first end of the second tube (30) are attached to the liquid production means (50) at a port using standard fittings (not shown) at the junction (54). Similarly the second outer tube (26') is positioned next to the liquid analysis means (54). The inner tube (12) and the second outer tube (26') are sealed (38). The second end of the inner tube (16) and the second end of the outer tube (32) are attached to the liquid analysis means (52) at a port using standard fittings (not shown) at the junction (56).

Figure 4:
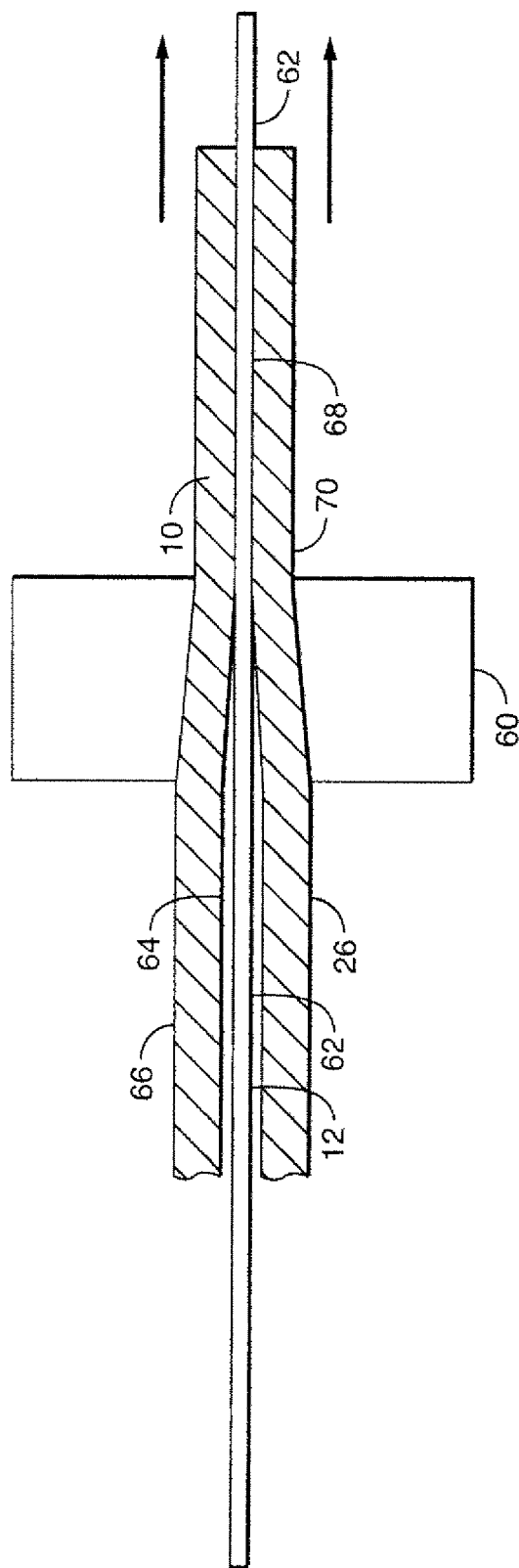
FIG. 4 depicts an apparatus being made in accordance with the invention.

FIG. 4 shows a method of manufacture of a tube (10) in accordance to one aspect of the invention. It shows a tube in which an outer tube (26) is being drawn onto an inner tube (12). Before being passed through a die (60) the inner tube has the desired external diameter (62). The outer tube, has an internal diameter (64) and an external diameter (66). Upon being passed through a die (60) in the direction shown by the arrows, the inner tube has the same desired external diameter (62). The outer tube now has an internal diameter (68) and an internal diameter (70).

In this example, the outer tube (26) has been overdrawn so that the internal diameter (68) of the outer tube is approximately the same as the external diameter (62) of the inner tube (12).

In this example it is important to provide a die of an appropriate size in order to draw the outer tube down to the exact desired size. A die is made of a hard material; typically this may be Tungsten Carbide.

The tubing is propelled through the die by being pushed with a mandrel, or more preferably by being pulled through the die on a draw carriage system in the direction shown by the arrow. The propulsion system is known in the art.

The inner tube may have been drawn using a similar process, or may have been manufactured as hypodermic tubing, which can be purchased from standard suppliers. Typically the internal diameter of the inner tube is in the range of 0.002-0.005 inch (0.058-0.127 mm).

The tubing is suitable for use in any part of a Chromatography system in which there is a need for robust, low internal diameter tubing. The tubing may also be used in any other apparatus where there is a similar need for robust, low internal diameter tubing that is capable of withstanding high pressures.

What is claimed:

1. Apparatus for conveyance of fluid comprising:
   a first tube having a first end and a second end, an inner wall and an outer wall, said inner wall defining a passage for fluid and said outer wall having at least one first receiving section for receiving an inner wall from a second tube wherein said inner wall of said first tube has a diameter in the range of between about 0.002 to 0.005 inch (0.0508 to 0.127 mm); and,
   a second tube having a first end and a second end, an inner wall and an outer wall, said inner wall defining a chamber for receiving said first tube and having at least one second receiving section for receiving said outer wall of said first tube wherein at least one of said first tube and said second tube are drawn down such that said first receiving section and said second receiving section of said first tube and said second tube are to within between about $1/100$ to $1/2000$ inch (0.254 mm to 0.0127 mm) of each other and sealed by welding.

2. Apparatus for conveyance of fluid as claimed in claim 1 where said first tube and said second tube are sealed at least one of said first end and said second end.

3. Apparatus for conveyance of fluid as claimed in claim 1 where said first tube and said second tube are sealed at both said first end and said second end.

4. Apparatus for conveyance of fluid as claimed in claim 1 wherein at least one of said first tube and said second tube are made of metal.

5. Apparatus for conveyance of fluid as claimed in claim 4 where said metal is selected from the group consisting of: copper, stainless steel, stainless steel alloys, steel, iron, nickel, nickel alloys, cobalt alloys, nickel/cobalt alloys, brass, copper alloys, aluminum or aluminum alloys.

6. Apparatus for conveyance of fluid as claimed in claim 5 where said first tube is made of stainless steel and said second tube is made of copper.

7. Apparatus for conveyance of fluid as claimed in claim 1 where said first tube and said second tube are sealed by Laser welding.

8. Apparatus for conveyance of fluid as claimed in claim where said first tube and said second tube are sealed by Electron beam welding.

9. Apparatus for conveyance of fluid as claimed in claim 1 where there are at least two second tubes.

10. Apparatus for conveyance of fluid as claimed in claim 9 where said at least two second tubes are at least at said first end and said second end of the first tube.

11. Apparatus for conveyance of fluid comprising:
    a first tube made of stainless steel having a first end and a second end, an inner wall and an outer wall, said inner wall defining a passage for fluid and said outer wall having at least one first receiving section for receiving an inner wall from a second tube; and,
    a second tube made of copper having a first end and a second end, an inner wall and an outer wall, said inner wall defining a chamber for receiving said first tube and having at least one second receiving section for receiving said outer wall of said first tube wherein at least one of said first tube and said second tube are drawn down such that said first receiving section and said second receiving section of said first tube and said second tube are to within between about $1/100$ to $1/2000$ inch (0.254 mm to 0.0127 mm) of each other and sealed by welding, where said inner wall of said first tube has a diameter in the range of between about 0.002-0.005 inch (0.0508-0.127 mm).

12. Apparatus for conveyance of fluid comprising:
    a first tube having a first end and a second end, an inner wall and an outer wall said inner wall defining a passage for fluid and said outer wall having at least one first receiving section for receiving an inner wall from a second tube wherein said inner wall of said first tube has a diameter below 0.125 inch (3.175 mm); and,
    a second tube made of copper and having a first end and a second end, an inner wall and an outer wall, said inner wall defining a chamber for receiving said first tube and having at least one second receiving section for receiving said outer wall of said first tube wherein at least one of said first tube and said second tube are drawn down such that said first receiving section and said second receiving section of said first tube and said second tube are to within between about $1/100$ to $1/2000$ inch (0.254 min to 0.0127 mm) of each other and sealed by welding, where said first tube is a thin walled tube made of 304 or 316 grade stainless steel.

13. A method of fluid conveyance comprising:
    providing an apparatus having a first tube, and a second tube, said first tube having a first end and a second end, an inner wall and an outer wall, said inner wall defining a passage for fluid and said outer wall having at least one first receiving section for receiving an inner wall from said second tube, said second tube having a first end and a second end, an inner wall and an outer wall wherein said inner wall of said first tube has a diameter below 0.125 inch (3.175 mm), said inner wall defining a chamber for receiving said first tube and having at least one second receiving section for receiving said outer wall of said first tube where said receiving sections of said first tube and said second tube are drawn down to within between about $1/100$ to $1/2000$ inch of each other and sealed by welding; and, directing a fluid into said passage at said first end and removing said fluid at said second end for conveying said fluid.

* * * * *